United States Patent [19]

Hashimoto et al.

[11] Patent Number: 4,547,854

[45] Date of Patent: Oct. 15, 1985

[54] METHOD OF CONTROLLING LINEUP OF TOOLS IN NUMERICAL CONTROL MACHINE TOOL

[75] Inventors: Hideo Hashimoto, Konan; Katsuhiko Tomori, Kagamihara; Yuji Sano, Hashima, all of Japan

[73] Assignee: Yamazaki Machinery Works, Ltd., Niwa, Japan

[21] Appl. No.: 437,169

[22] Filed: Oct. 27, 1982

[30] Foreign Application Priority Data

Nov. 5, 1981 [JP] Japan ................... 56-178075

[51] Int. Cl.$^4$ ............... G06F 15/46; G05B 19/18
[52] U.S. Cl. .................... 364/474; 364/167; 364/171; 29/568
[58] Field of Search ............... 364/131–133, 364/138, 148, 167, 171, 474–475; 29/568; 408/31, 34, 42–44; 83/404, 404.1–404.4, 548–549, 550

[56] References Cited

U.S. PATENT DOCUMENTS

| | | | |
|---|---|---|---|
| 3,626,385 | 12/1971 | Bouman | 364/138 X |
| 4,034,212 | 7/1977 | Paxton | 364/138 X |
| 4,052,601 | 10/1977 | Corni | 364/138 X |
| 4,135,238 | 1/1979 | Hamill, III et al. | 364/474 X |
| 4,237,598 | 12/1980 | Williamson | 29/568 |
| 4,293,913 | 10/1981 | Nishimura et al. | 364/474 |
| 4,314,329 | 2/1982 | Crewe et al. | 364/474 X |
| 4,370,705 | 1/1983 | Imazeki et al. | 364/167 X |

FOREIGN PATENT DOCUMENTS 1567762 5/1980 United Kingdom .

Primary Examiner—Joseph Ruggiero
Assistant Examiner—Gary V. Harkcom
Attorney, Agent, or Firm—Cushman, Darby & Cushman

[57] ABSTRACT

The machining to be achieved is classified in accordance with the machining shape into a plurality of machining units. A tool combination memory stores tool combination lines each containing an array of tool information in the sequence of use in each machining unit. As the operator appoints some of the machining units, corresponding tool combination lines are read out from the tool combination memory and are stored in sequence in a machining program memory. The tools presented by the tool combination lines in the machining program memory are then rearranged and lined up on the basis of the tool to form a machining tool combination. The machining is made in accordance with the machining tool combination in such a manner that the machinings of different machining units achievable by a tool common to these machining units are conducted simultaneously without necessitating repeated mounting and demounting of such tool.

9 Claims, 14 Drawing Figures

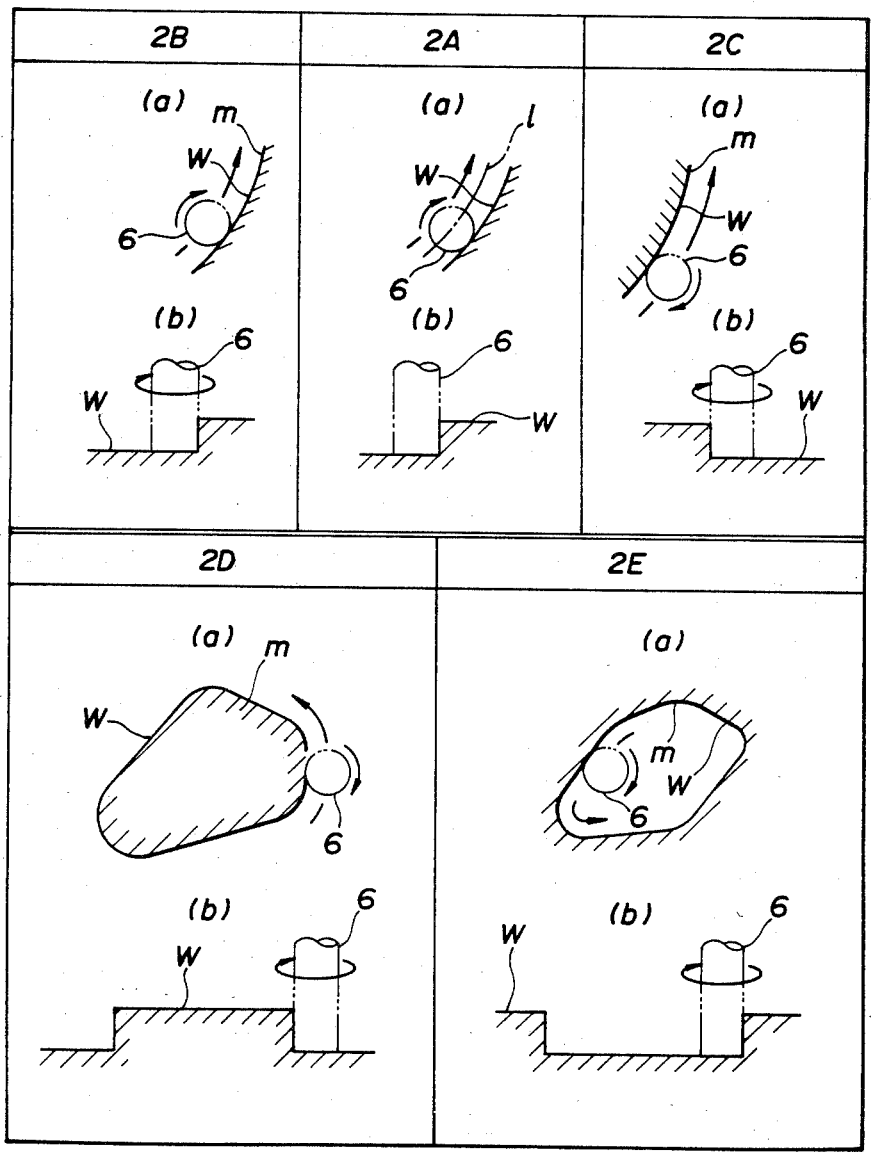
FIG. 6 (PART I)

FIG. 6 (PART 2)
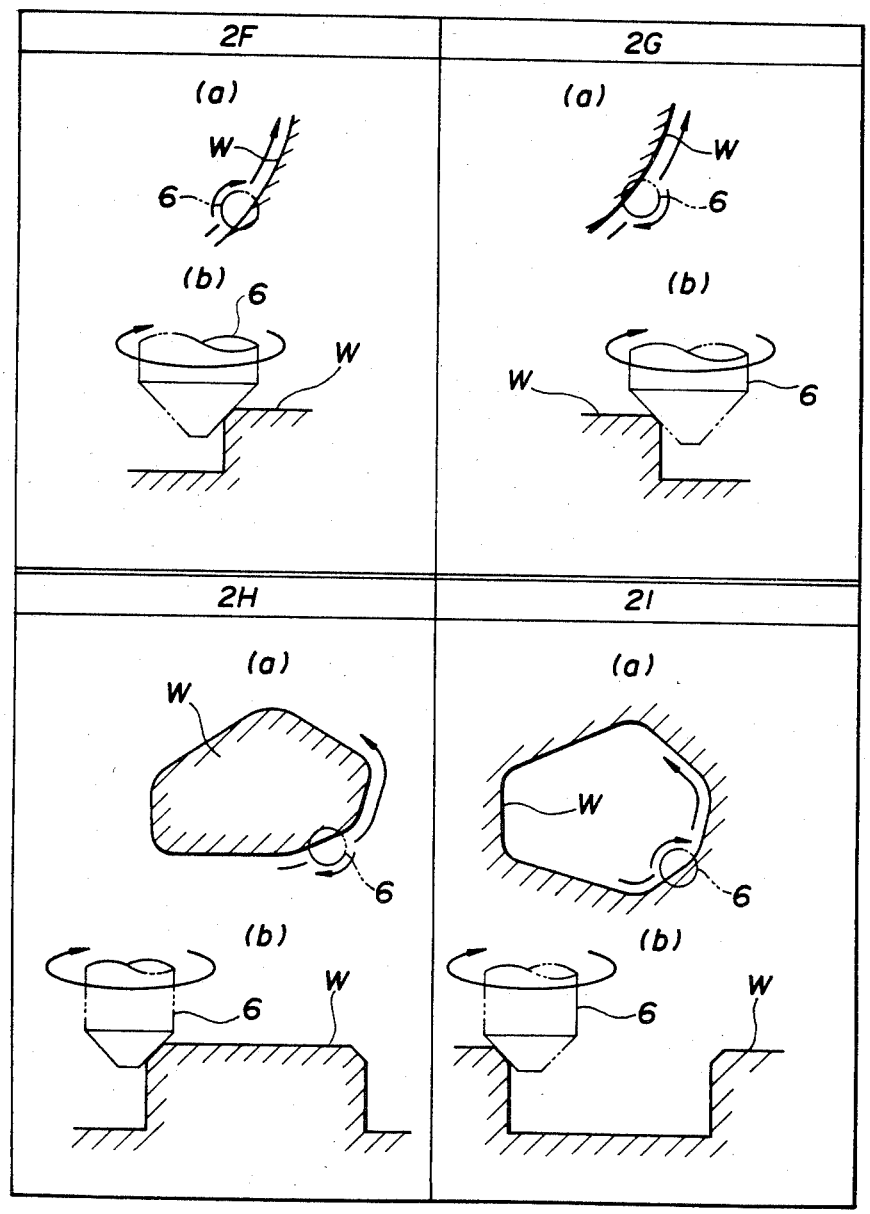

FIG. 7 (PART I)
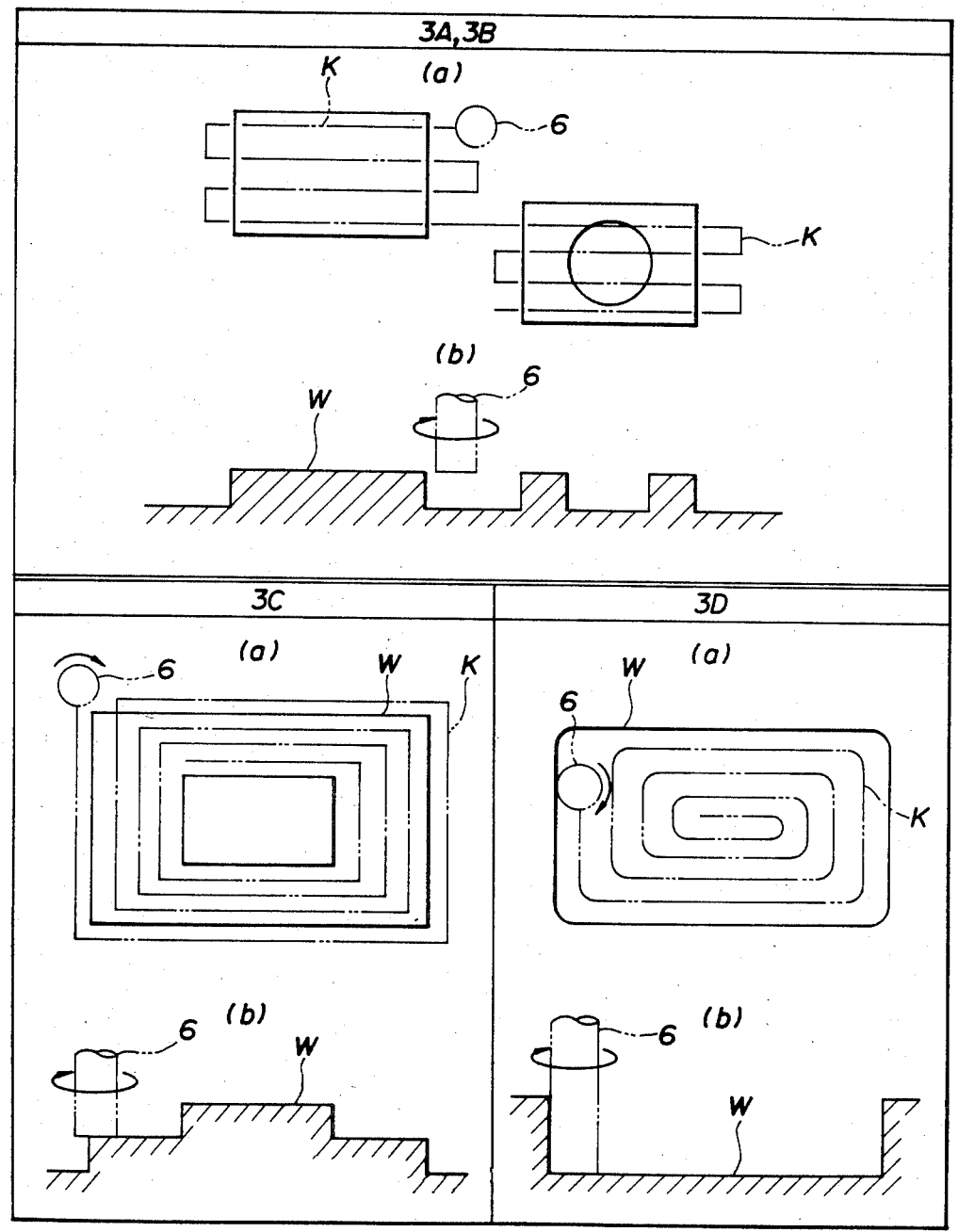

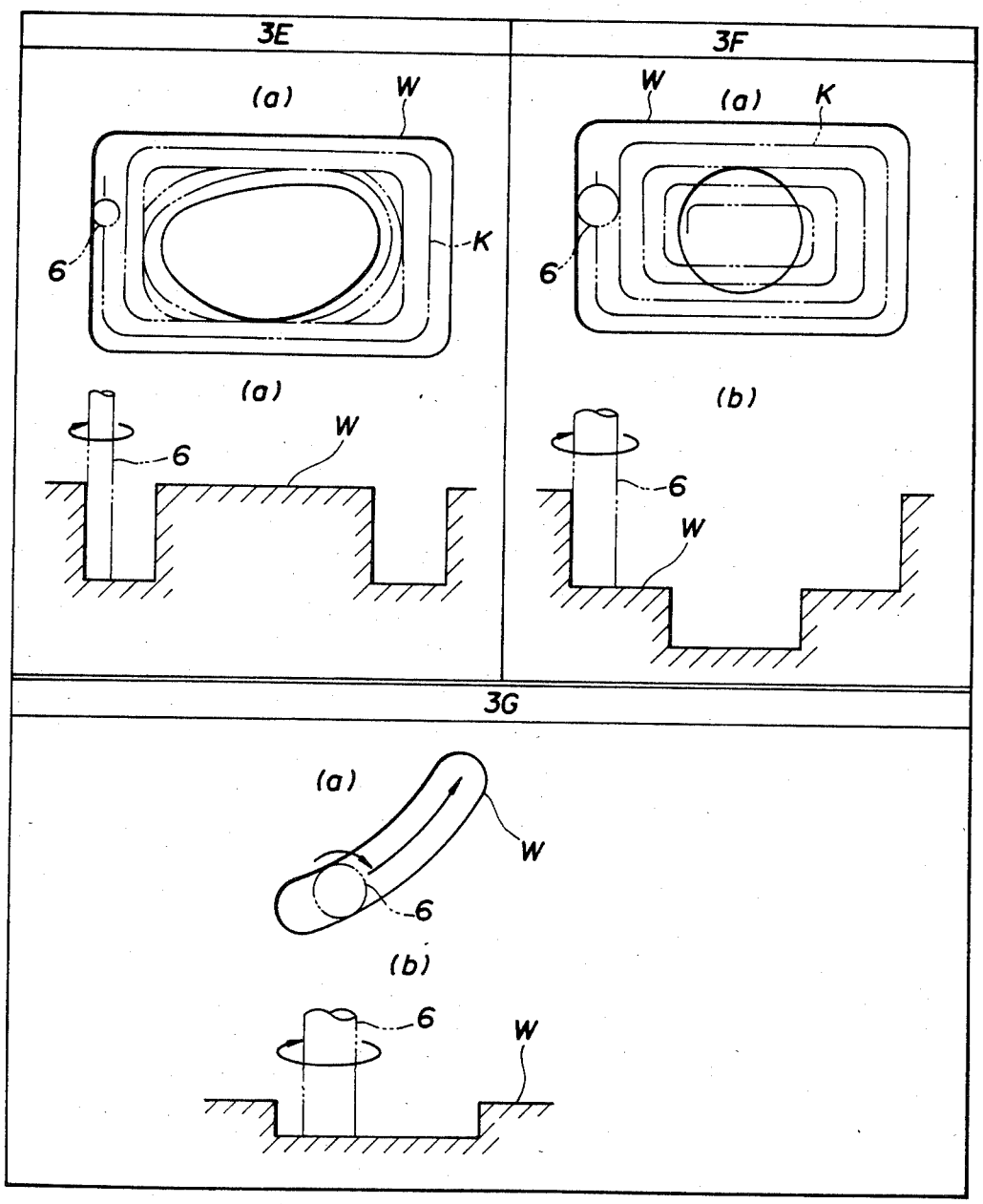
FIG. 7 (PART 2)

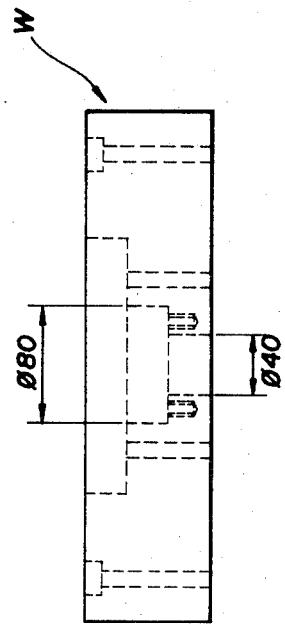
FIG. 8
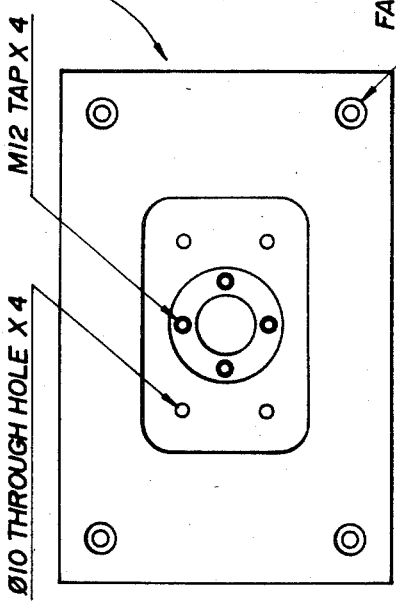
FIG. 9a
FIG. 9b

FIG. 10

| UNO | | NAME | | CAL | SAF |
|---|---|---|---|---|---|
| 0 | DATA OF MATERIAL | | | | |
| 1 | COORDINATE SYSTEM | | | | |
| 2 | FACE MILL TCL (3A) TCL | R | FACE MILL | 100.0 | A |
| | | F | FACE MILL | 100.0 | B |
| 3 | POCKET END MILL TCL (3D) TCL | R | END MILL | 30.0 | A |
| | | F | END MILL | 30.0 | A |
| 4 | DRILL HOLE (1A) (⌀10) TCL | | SPOT DRILL | 14.0 | |
| | | | DRILL | 10.0 | |
| 5 | TAP HOLE (1E) (M12) TCL | | SPOT DRILL | 14.0 | |
| | | | DRILL | 10.0 | |
| | | | TAP | M12 | |
| 6 | FACING HOLE (1B) (⌀30/⌀10) TCL | | SPOT DRILL | 14.0 | |
| | | | DRILL | 10.0 | |
| | | | END MILL | 30.0 | A |
| | | | CHAMFERING CUTTER | 10.0 | A |
| 7 | BORING HOLE (1F) (⌀80/⌀40) TCL | | SPOT DRILL | 14.0 | |
| | | | DRILL | 32.0 | |
| | | | BORING | 38.5 | |
| | | | BORING | 39.5 | |
| | | | END MILL | 30.0 | A |
| | | | BORING | 79.5 | |
| | | | CHAMFERING CUTTER | 10.0 | A |
| | | | CHAMFERING CUTTER | 10.0 | A |
| | | | BORING | 40.0 | |
| | | | BORING | 80.0 | |
| 8 | CHAMFER RIGHT (2F) | | CHAMFERING CUTTER | 10.0 | A |
| 9 | END | | | | |

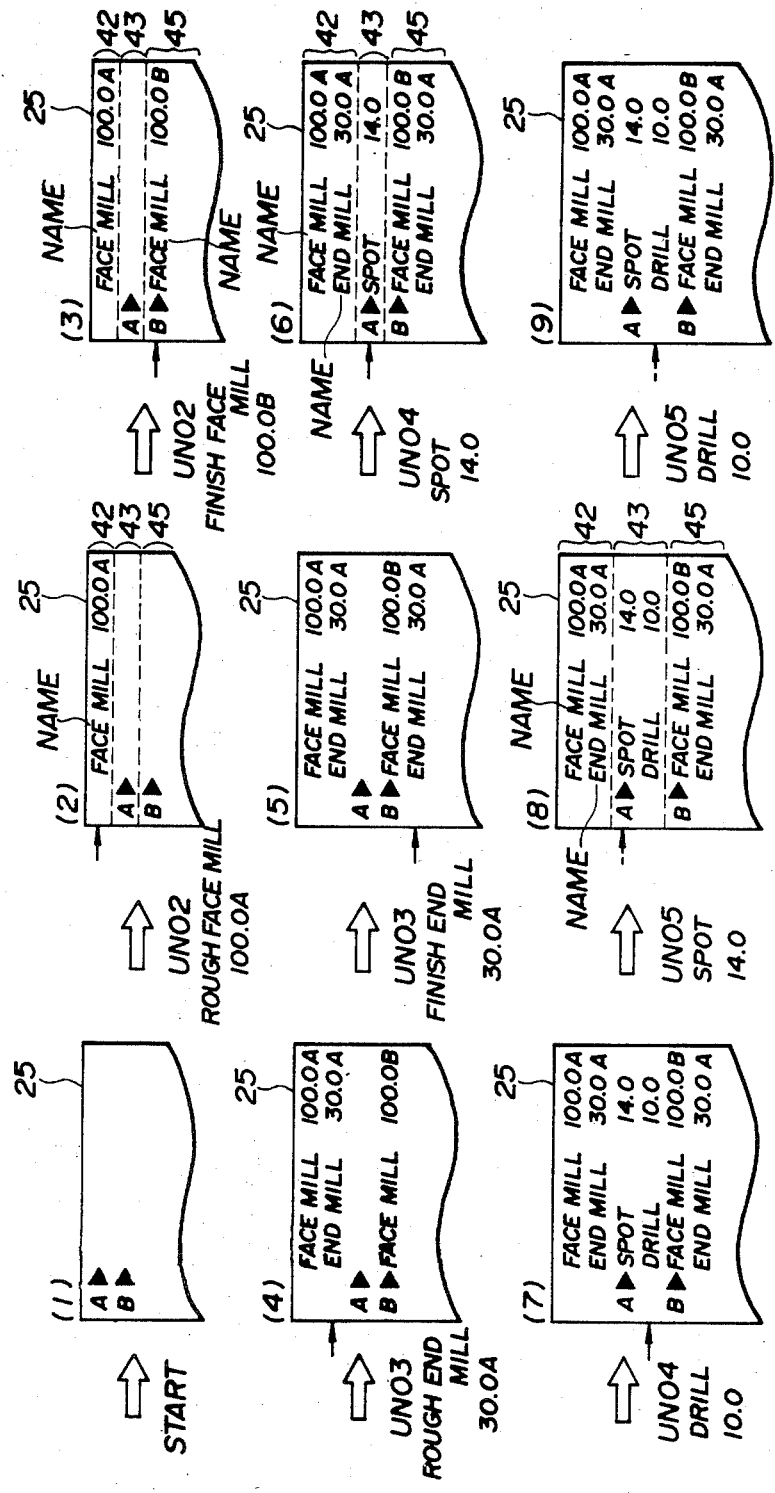
FIG.12 (PART 1)

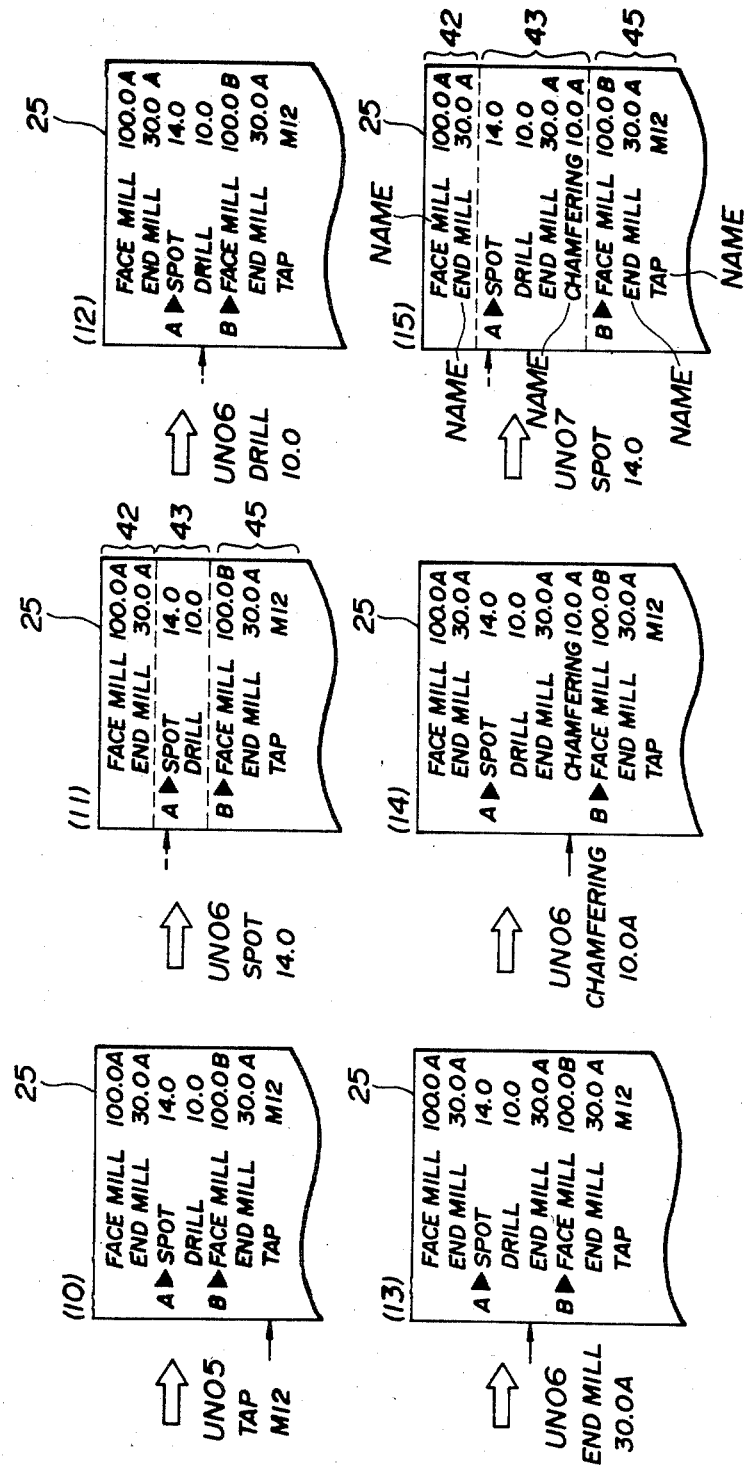
FIG. 12 (PART 2)

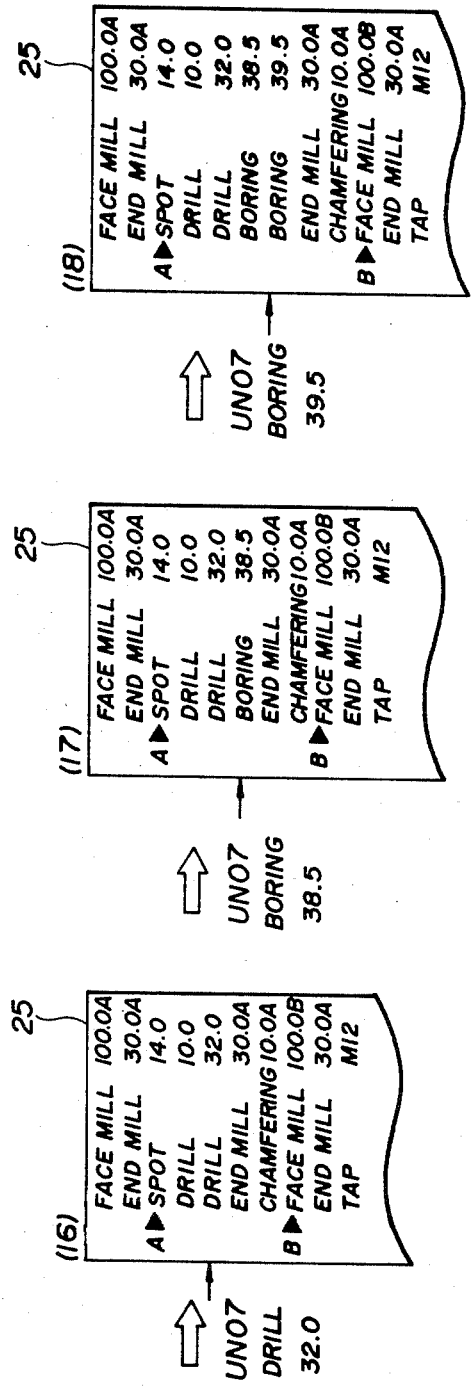

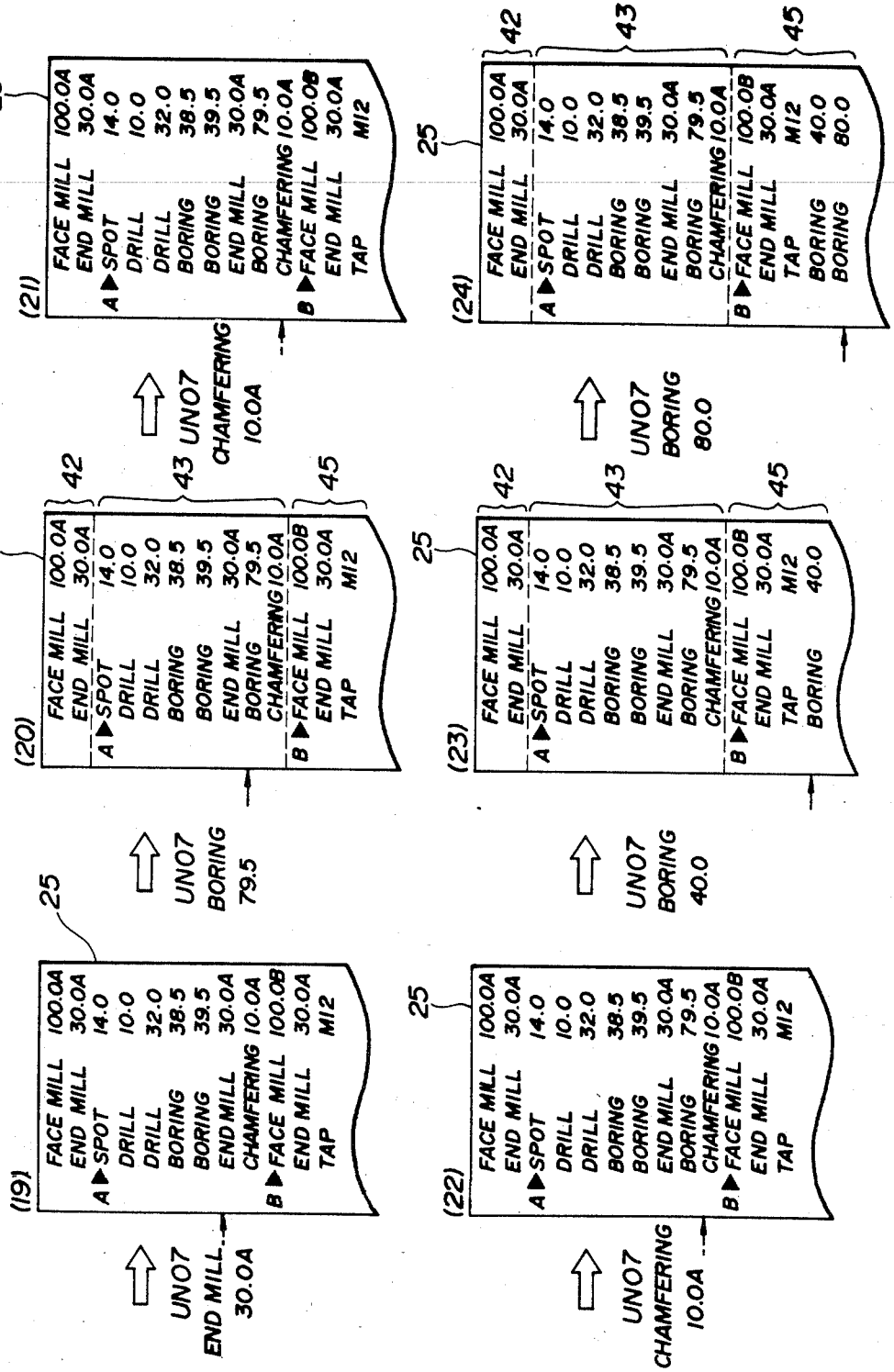

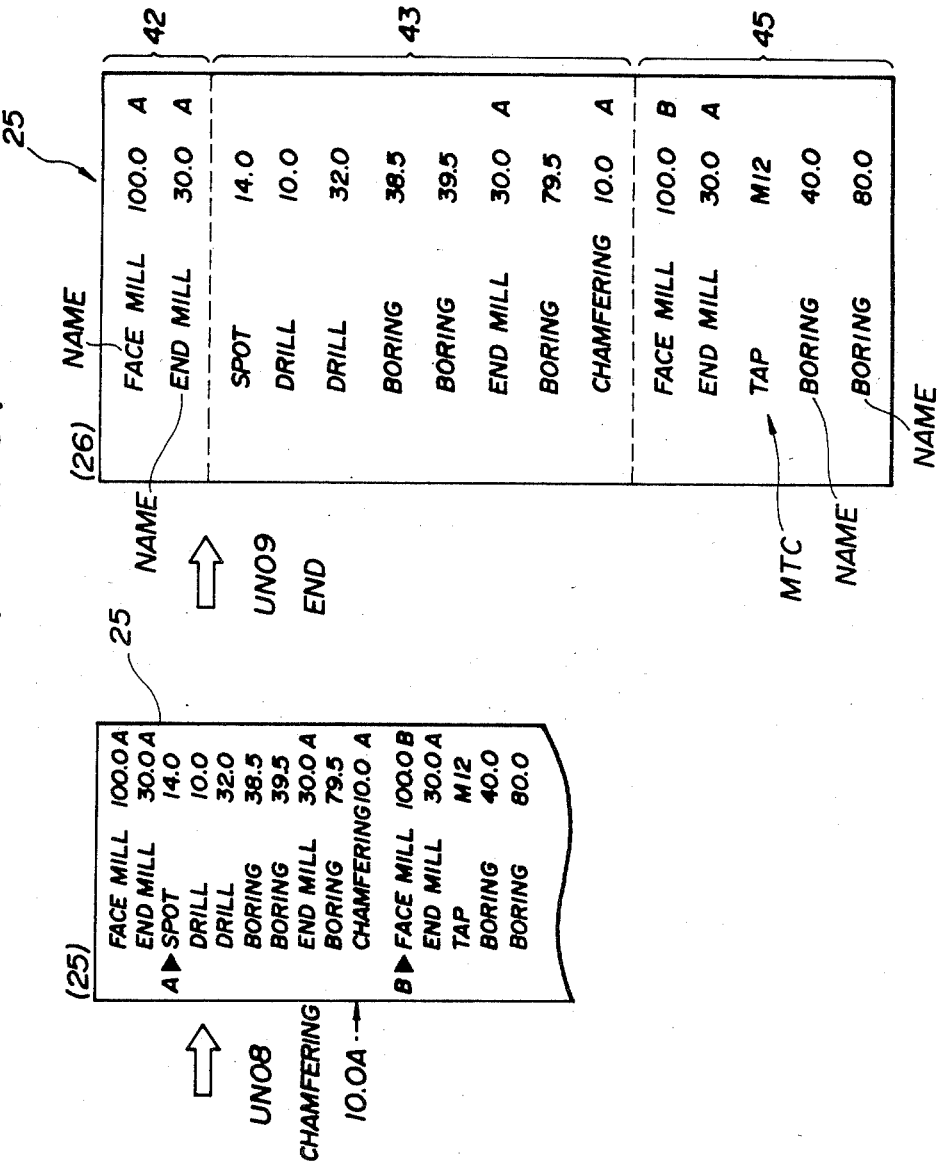
FIG. 12 (PART 5)

FIG. 13

METHOD OF CONTROLLING LINEUP OF TOOLS IN NUMERICAL CONTROL MACHINE TOOL

BACKGROUND OF THE INVENTION

The present invention relates to a method of controlling lineup of tools in numerical control machine tool such as machining center.

Hitherto, for effecting a predetermined machining in a machining center, it has been necessary to give to the machine an instruction concerning the tool to be used to accomplish a desired machining shape at the time machining was to be carried out. Therefore, it has been an ordinary measure for a programmer to work out the machining program to be executed by the machining center including the specific details of the kinds of tools to be used and the sequence of the use of these tools optimum for obtaining the final shape shown in drawings depicting the desired shape of the finished product. Such a detailed programming process, however, takes much labor and time and, in addition, requires a skilled programmer having abundant knowledge in the field concerned, in addition to the operator who actually manages the machine, in order to obtain satisfactory operation of the machine. This impractically restricts the widespread use of such machining centers.

Under this circumstance, an arrangement has been provided for facilitating the programming of a machining center. The machining is sorted according to the machining shape into three modes: namely, a point machining mode, line machining mode and a surface machining mode, each machining mode being further classified into a plurality of machining units and, as the operator inputs the machining shape shown in the drawings in terms of these machining units, the machining program is automatically formed in the machine and the machine executes the machining in accordance with the thus formed machining program, so that the necessity for the programming by a programmer is eliminated to obviate the above-described problem of the prior art. According to this method, the drill hole machining unit for example is composed of three machining elements: namely, a center drilling, drill boring and chamfering. The drill hole machining, therefore, is performed by using a spot drill, drill and a chamfering cutter in the mentioned order. In the case where a machining operation employs a number of such machining units which are executed sequentially in the appointed order, it is often experienced that the machining element to be performed by an identical tool is performed repeatedly in various portions of the series of machining, resulting inconveniently in an increased frequency of demounting and mounting of such tool on the machine spindle and, hence, in an unnecessarily long machining time for completing the machining.

SUMMARY OF THE INVENTION

Accordingly, it is a primary object of the invention to provide a method of controlling lineup of tools in a numerical control machine tool, in which the machining elements to be made by a tool common to a plurality of machining units are performed simultaneously without repeatedly mounting and demounting the common tool.

To this end, according to the invention, there is provided a method of controlling lineup of tools in a numerical control machine tool comprising the steps of: classifying the required machining into a plurality of machining units in accordance with the machining shape; providing a tool combination memory, machining program memory and a tool set memory; storing, in the tool combination memory, tool combination lines containing the names of tools in the sequences of use for respective machining units; appointing the machining units to read out corresponding tool combination lines as units; storing, in the machining program memory, the tool combination lines for respective machining units; forming a machining tool combination in the tool set memory by rearranging and lining up, on the basis of the tools, the tools contained by the tool combination lines stored in the machining program memory; and performing the machining in accordance with the machining tool combination in such a manner that the machinings of different machining units, achieveable by a tool common to these machining units, are conducted simultaneously without necessitating the repeated mounting and demounting of such tool.

The above and other objects, features and advantages of the invention will become clear from the following description of the preferred embodiment taken in conjunction with the accompanying drawings.

BRIEF DESCRIPTION OF THE DRAWINGS

FIG. 6 shows machining shapes of various machining units included by a line machining mode, in which the parts having suffix (a) are plan views while the parts having suffix (b) are front elevational views;

FIG. 7 shows machining shapes of various machining units included by a surface machining mode, in which the parts have suffix (a) are plan views while the parts having suffix (b) are front elevational views;

FIG. 8 is a schematic illustration of the content of a tool combination memory.

FIG. 9a is an example of a front elevational view of a work to be machined, usable as a machining drawing;

FIG. 9b is an example of a plan view of the work shown in FIG. 9a, usable as a machining drawing;

FIG. 10 is an illustration of a machining program to be executed for machining the work shown in FIG. 9;

FIG. 12 is an illustration of a tool lineup to be given to a tool set memory; and FIG. 13 is a schematic illustration showing the detail of the tool set memory.

DESCRIPTION OF THE PREFERRED EMBODIMENTS

A preferred embodiment of the invention will be further explained with reference to the accompanying drawings.

Figure 1:
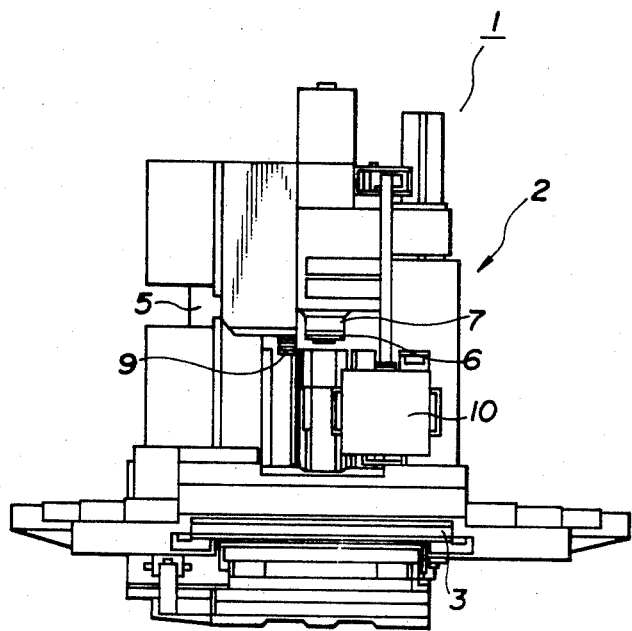
FIG. 1 is a front elevational view of an example of a machining center to which the method of the invention is applied.
Figure 2:
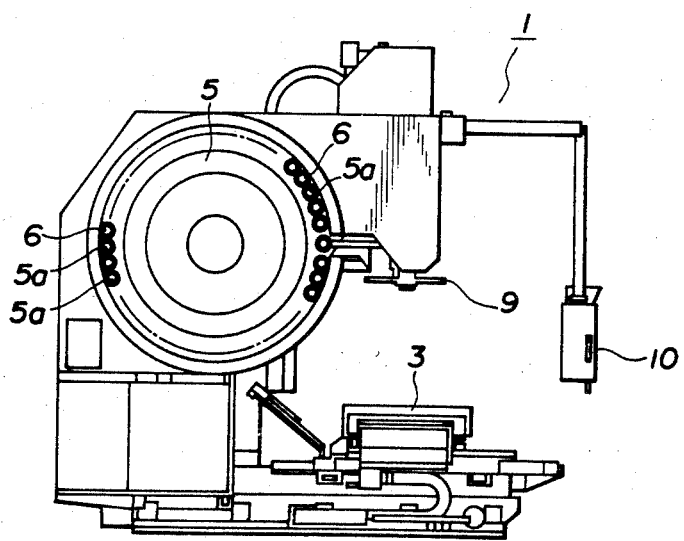
FIG. 2 is a side elevational view of the machining center as shown in FIG. 1.
Figure 3:
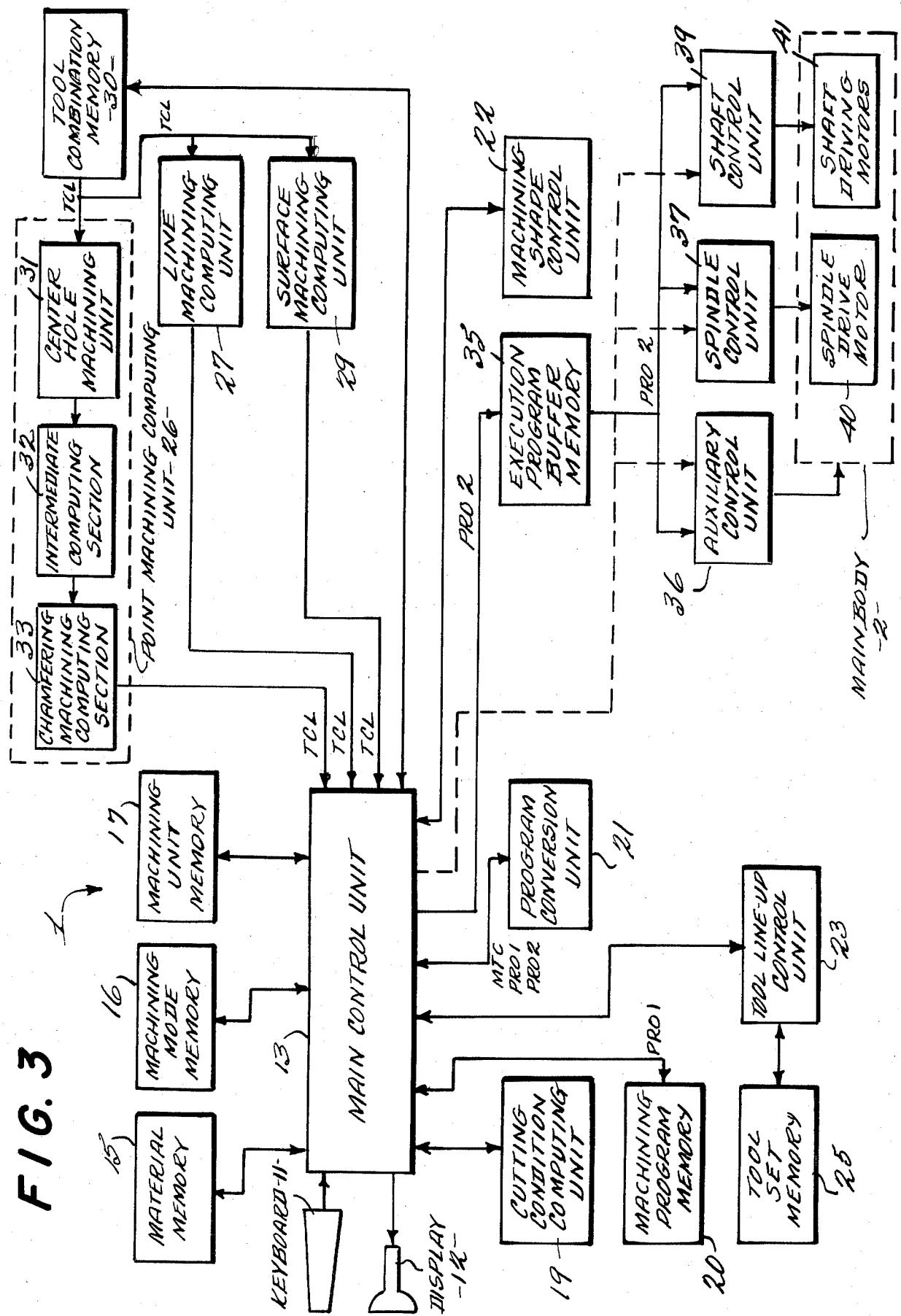
FIG. 3 is a control block diagram of the machining center shown in FIG. 1.

As will be seen from FIGS. 1 and 2, a machining center 1 which is numerical control machine tool, to which the method of the invention is applied, has a main body 2 and an X-Y table 3 which is movable in a horizontal plane in two orthogonal directions relatively to the main body 2. The X-Y table 3 can carry a workpiece to be machined. A substantially disc-shaped magazine 5 is rotatably mounted on the main body 2. The magazine 5 is provided on its outer periphery with a plurality of magazine pockets 5a at a constant circumferential pitch. Each pocket is identified by an identification No. of its own, and is adapted to receive a tool 6. A spindle 7 is rotatably carried by a portion of the main body 2 above the X-Y table 3. A tool exchanger 9 disposed at the left side of the spindle 7 as viewed in FIG. 1 is adapted to withdraw from the magazine 5 a tool for the next step of machining process and mount the same on the spindle 7, while demounting the old tool 6 from the spindle 7 and returning the same into the magazine 5. A key board 11 and a display 12, which will be explained later, are provided on a control panel 10 which in turn is carried by the main body 2 of the machining center. As will be seen from FIG. 3, the key board 11 and the display 12 are connected to a main control unit 13 to which connected also are a material memory 15, machining mode memory 16, machining unit memory 17, cutting condition computing unit 19, machining program memory 20, and a tool lineup control unit 23. A tool set memory 25 is connected to the tool lineup control unit 23. A program conversion unit 21, machining shape control unit 22, point machining computing unit 26, line machining computing unit 27 and a surface machining computing unit 29 are connected to a tool combination memory 30 which is annexed to the main control unit 13. More specifically, the point machining computing unit 26 includes, in the form of a series connection, a center hole machining computing section 31 connected to a tool combination memory 30, an intermediate machining computing section 32 and a chamfering machining computing section 33 connected to the main control unit 13. An execution program buffer memory 35 is connected to the main control unit 13. An auxiliary control unit 36, spindle control unit 37 and a shaft control unit 39 are connected to the buffer memory 35. The auxiliary control unit 36 is adapted to perform various auxiliary control functions such as control of driving of the magazine 5 and tool exchanger 9, turning on and off of the cutting water supply, and so forth. The spindle control unit 37 and the shaft control unit 39 are connected, respectively, to a spindle drive motor 40 and a plurality of shaft driving motors 41 to effect the drive control of these spindle and shafts.

Figure 4:
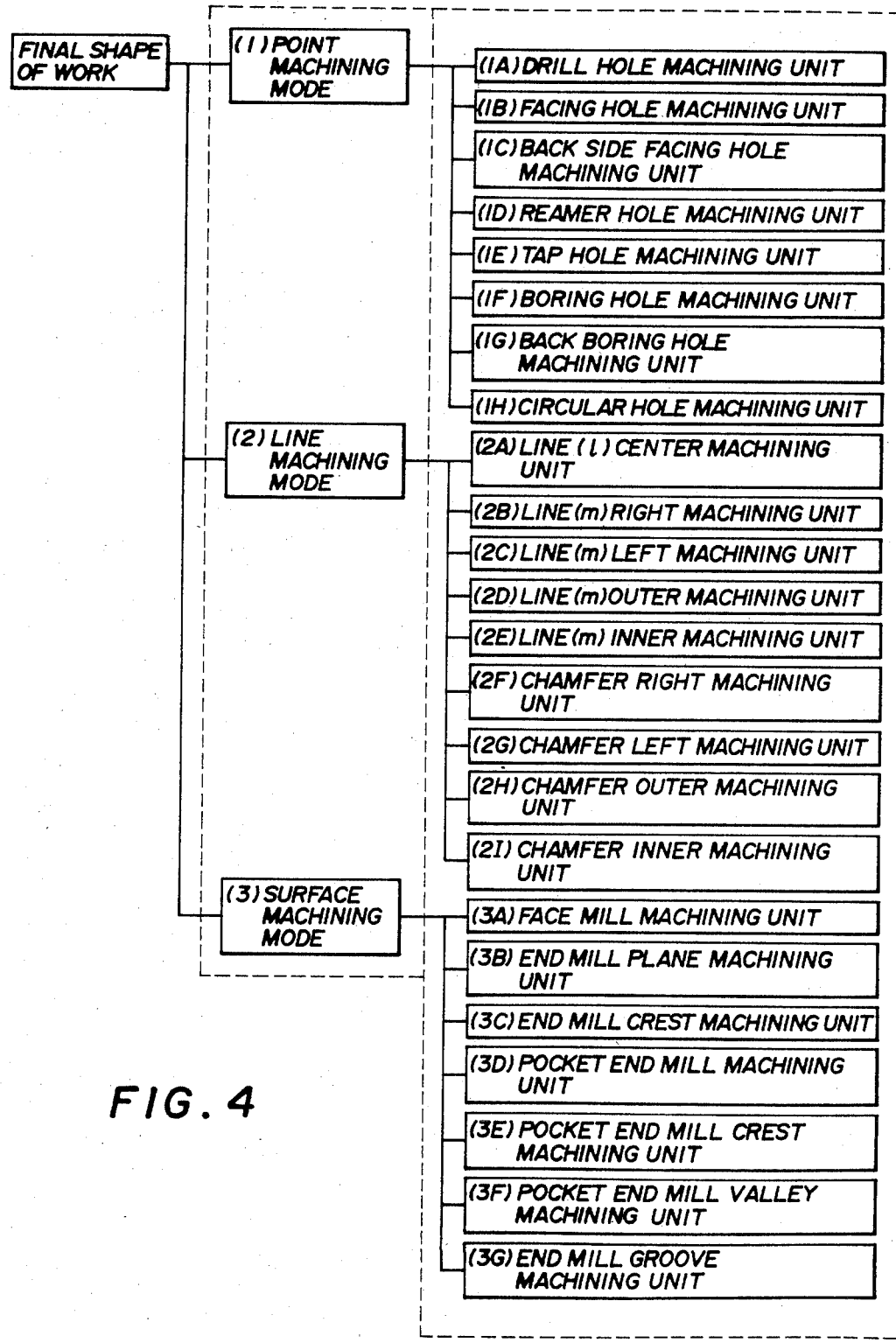
FIG. 4 is an illustration of machining units for different machining modes.
Figure 5:
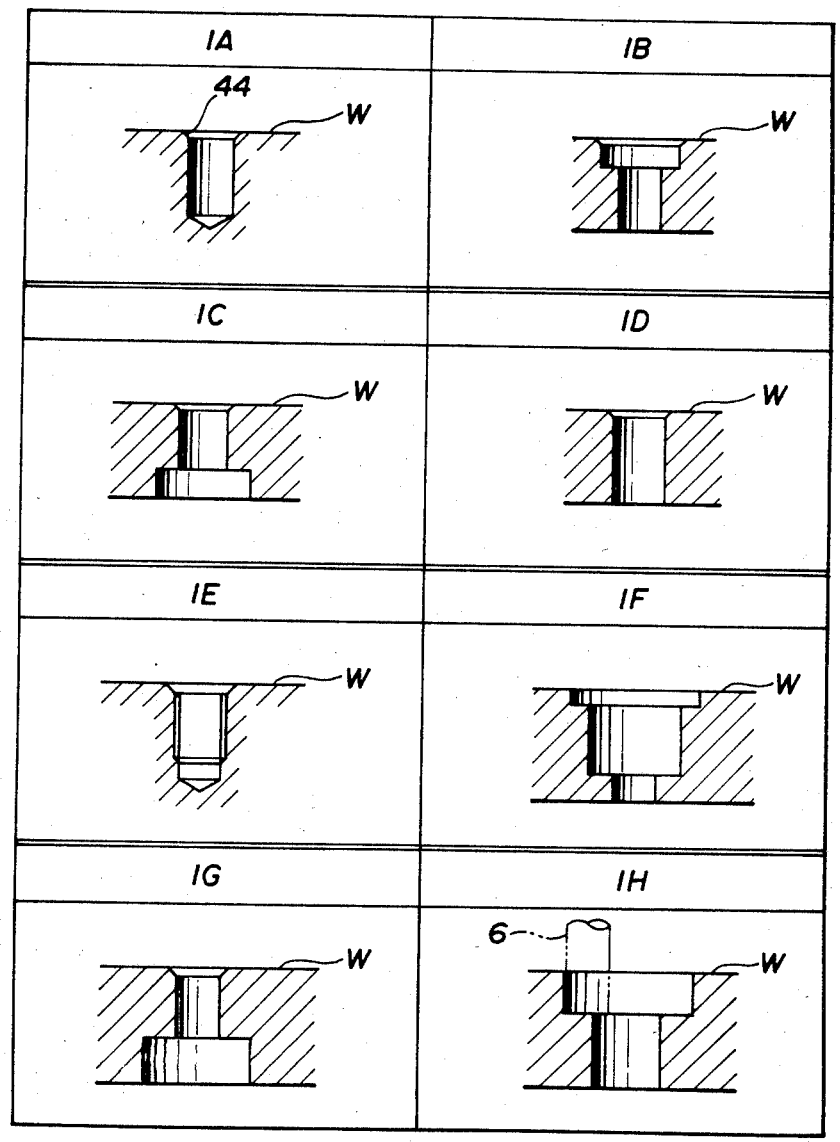
FIG. 5 is a front elevational view showing the machining shapes of machining units constituting a point machining mode.

For machining a work in the machining center 1 having the described construction, the main control unit 13 reads out the material table from the material memory 15 and displays the same on the display 12, to permit the operator to input the kind of material of the work through the key board 11. Then, the main control unit 13 reads out the machining mode to be performed from the machining mode memory 16 and shows the mode to the operator. As shown in FIG. 4, the machining modes are sorted into three kinds of machining modes: namely, a point machining mode which employs a drill or the like, line machining mode which employs an end mill or the like and a surface machining mode which employs a face mill or the like tool. The operator then examines the final shape of the work in the drawing and makes a judgement as to which one of these three machining modes the machining to be performed first belongs, and inputs the selected machining mode through the key board 11. As a result, the main control unit 13 makes a display on the display 12 the machining units corresponding to the selected machining mode, so that the operator can judge to which one of the displayed machining units the machining shape shown in the drawing belongs, and appoints and inputs the appropriate machining unit. Namely, the machining unit memory 17 stores, as shown in FIG. 4, a plurality of machining units 1A to 1H, 2A to 2I and 3A to 3G for each machining mode. The machining shapes of respective machining units 1A to 1H of the point machining mode are illustrated in FIG. 5. Similarly, the machining shapes of machining units 2B to 2I of the line machining mode are shown in FIG. 6, while the machining shapes 3A to 3G of the machining units belonging to the surface machining modes are shown in FIG. 7. In the drawings, a reference numeral 6 designates a tool, while symbols W and K represent the work and the locus of the center of the tool. Since almost all of the patterns of machining achieveable in the machining center 1 are covered, the operator can immediately select and input the suitable machining unit by comparing the desired shape of the workpiece, as shown in the drawing, with the alternative machining shapes displayed on the display.

Upon receipt of the operator's designation of the selected machining unit, the main control unit 13 reads out from the tool combination memory 30 a tool combination line TCL corresponding to the selected machining unit, and outputs the same selectively to one of the machining computing units 26, 27 and 29 corresponding to the machining unit which has been selected beforehand by the operator.

More specifically, the tool combination memory 30 stores, as shown in FIG. 8, the names of the tools to be employed in execution of each machining unit in a line from the left to the right side in the form of a tool combination line TCL, in each address ADS. The arrangement is such that, once a machining unit is selected, the tool combination line TCL corresponding to the appointed machining unit is delivered to the corresponding one of the computing units 26, 27 and 29. Assuming here that the operator has selected a drill hole machining unit which is of the point machining mode, the main control unit 13 reads a series of tools, i.e. the tool combination line TCL, consisting of a spot drill, drill and a chamfering cutter which are used for the drilling, from 001 of the address ADS in the memory 30, and the tool combination line TCL thus read out is delivered as a unit to the point machining computing unit 26. Then, the center hole machining computing section 31 computes the diameter of the spot drill to be used first, from the machining data such as hole diameter which is inputted by the operator through the key board 11. The computing section 31 determines also whether the chamfering can be made simultaneously with the center boring, by comparing the hole diameter and the diameter of the spot drill. Namely, if the diameter of the spot drill is greater than the diameter of the drill hole, it is possible to machine the chamfer portion 44 simultaneously with the machining of the center hole in FIG. 5 by means of the spot drill. Then, the intermediate machining computing section 32 computes the diameter of the drill to be used subsequently to the spot drill and the pattern of use of the drill, e.g. penetration per cycle, total penetration and so forth. Meanwhile, the chamfering machining computing section 33 computes the diameters of the chamfering cutter to be used for the chamfer portions 44 of holes other than the hole in which the chamfering is conducted by means of a spot drill. The result of the computation is delivered through the main control unit 13 to the cutting condition computing unit 19 which in turn computes and determines the cutting condition such as feed speed and peripheral speed for each tool. These data are stored, together with the tool combination line TCL delivered by the point machining computing unit 26 containing the detailed data such as tool diameters, in the machining program memory 20. The thus stored data and tool combination line TCL form a machining program PR01. Then, a demand is displayed on the display 12 through the machining shape control unit 22 for the inputting of the machining position information. In response to this demand, the operator inputs the required data through the key board 11. The inputted values are stored as the machining position information in the machining program PR01.

Thus, the operator selects and inputs the machining unit for each machining mode and, at each time of the inputting, the tool combination line TCL corresponding to the selected unit is read out from the tool combination memory 30. Then, the tool diameters and the cutting conditions are determined in accordance with the tools and the sequence of use of the tools presented by the tool combination line TCL, and are stored in the program memory 20 together with the machining position information. For other machining units, the intermediate machining computing section 32 determines the diameters of tools such as end mill, boring, tap, reamer and so forth presented by the tool combination line TCL, as well as the pattern of use of these tools, for the machining of holes other than the center hole drilling and chamfering, and the line machining computing unit 27 and the surface machining computing unit 29 determine, from the tool combination line TCL read out from the tool combination memory 30 (the tool combination line TCL may contain only one tool), the number of tool blades and shapes corresponding to the extent of finishing which is given by the operator through the key board 11. In addition, the surface machining computing unit 29 determines the detail of data concerning the tools taking into account also the machining direction. In accordance with these data, the cutting condition computing unit 19 computes the cutting conditions and stores the thus determined conditions as the machining program PR01 in the memory 20.

Figure 11:
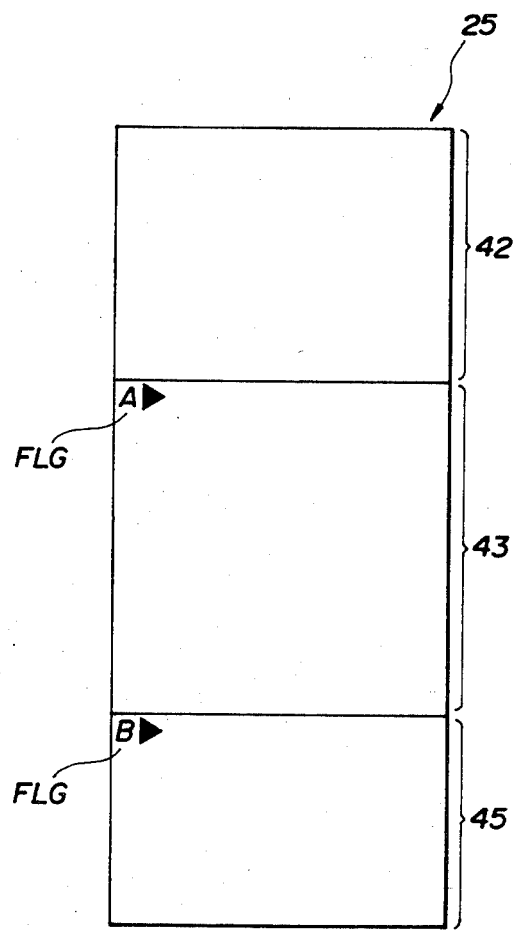
FIG. 11 is a schematic illustration of content of the tool set memory.

Then, as the inputting of a series of machining units for one work is completed in the described manner, the main control unit 13 drives the tool lineup control unit 23 to read out the tool combination lines TCL corresponding to a series of machining units stored in the machining program memory 20 and performs a computation for forming a machining tool combination MTC by rearranging or lining up the tools, which have been inputted in the form of successive machining units, on the basis of the tools in accordance with the sequence of use. For instance, when the machining is to be done on a workpiece W as shown in FIGS. 9a and 9b, a machining program PR01 schematically shown in FIG. 10 is stored in the memory 20 as the operator inputs successive machining units. Namely, the machining program PR01 includes the program unit Nos. UNO representing the order of inputting, names UNAME of machining units, tool names NAME, nominal sizes CAL, section suffix SAF and so forth which are arrayed in the order of the inputting from the upper side to the lower side of the Figure. On the other hand, as shown in FIG. 11, the tool set memory 25 is imaginarily divided into three variable regions: namely, a first region 42, second region 43 and a third region 45. Flags FLG are attached to the first addresses of the regions 43 and 45 for distinguishment of these regions from each other. The tool lineup control unit 23 reads the machining unit Nos. UNAME and the tool names NAME in the order of the program unit No. UNO, and stores the thus read out data in the first region 42 of the memory 25 when the read out machining unit belongs to the surface machining mode or the line machining mode provided that the tools employed by such machining unit are for rough machining (represented by "R" in the tool name NAME column in FIG. 10), whereas, when the tools are for finish machining (represented by "F" in the tool name NAME column), the data are stored in the third region 45. On the other hand, when the read out machining unit belongs to a point machining mode, as a rule, the tool lineup control unit 23 reads the names NAME of the tools in each machining unit in the sequence of use from the upper side to the lower side in FIG. 10, and stores them in the second region 43. However, data concerning reamers, taps and borings which can be regarded as being materially finishing tools because of small cutting depths are stored in the third region 45 as will be explained later (refer to the steps (10), (23) and (24) in FIG. 12). During storing of the tool names NAME in the second region 43, the tool lineup control unit 23 makes a search as to whether identical tool has been stored already in the second region 43, through examining the coincidence of the tool names NAME, nominal size CAL and the section suffix SAF. If an identical tool has been stored already, the duplicate storage of such tool is avoided but, if there is no tool identical to the tool to be stored, the name NAME of such tool is registered at the tail end of the tool names NAME of the tools which have been already stored in the second region 43.

This operation will be explained with reference to FIG. 12. In the step (2) of FIG. 12, a face mill for rough machining (represented by "rough face mill" in FIG. 12), whose unit No. UNO is 2, is stored in the first region 42, while, in the step (3), the finishing face mill (represented by "finish face mill" in FIG. 12) is stored in the third region 45. A spot drill 14.0 appears commonly in machining units which bear unit Nos. UNO 4, 5, 6 and 7. The spot drill 14.0 is registered in the region 43 for the first time in the step (6) of FIG. 12 but no registration is made in the memory 25 in steps (8), (11) and (15) in FIG. 12 because the registration of this tool has been made already in the section (6).

In the actual execution of the machining, it is strictly required to prevent any disorder or wrong sequence of use of tools other than those which are regarded as being finishing tools, i.e. wrong sequence of use of tools registered in the region 43. More specifically, assuming here the boring hole machining unit having the unit No. UNO 7, the spot drill 14.0, which having the tool used first in this machining unit UNO 7, is not registered in the step (15) in FIG. 12 because this tool has been registered already in the first address of the region 43. Then, as to the registration of the drill 32.0, this tool is to be registered in the trailing end of the tool line in the region 43 because the registration of this tool has not been made yet. However, the registration of the drill 32.0 at such a position causes an inconvenience in the actual machining that the drill 32.0 is put into operation after the operation of an end mill 30.0A which should be used after the drilling by the drill. To avoid this inconvenience, in registering the drill 32.0, a search is made for the tool name NAME of any tool which is to be used after the drill 32.0, i.e. the tools shown below drill 32.0 in FIG. 10 except the boring 40.0 and boring 80.0 which are regarded as finishing tools, has been previously stored in the region 43. If there is any (end mill 30.0A has been registered already in this case), as seen from the step (16) in FIG. 12, the tool name NAME of the drill 32.0 is registered at the position immediately before the tool name NAME of such tool which is the end mill 30.0A in this case. The same check and procedure are taken also for the subsequent tools boring 38.5 and boring 39.5, and the tool names of the boring 38.5 and the boring 39.5 are registered immediately before the end mill 30.0A as in the steps (17) and (18) in FIG. 12. The entry of the end mill 30.0A is not made in the step (19) in FIG. 12, because the tool name of this tool has been registered already. As to the next tool which is a boring 79.5, since a chamfering cutter 10.0 has been registered already, the boring 79.5 is registered immediately before the "chamfer 10.0A" in the region 43 as shown in the step (20) in FIG. 12. By so doing, it is possible to lineup in the region 43 the tool names NAME without disturbing the sequence of use of tools contained by the tool combination line TCL of each machining unit. The tool lineup control unit 23 performs the above-described search for an identical tool only for successively inputted machining units belonging to point machining mode (for successive units 4, 5, 6 and 7 in FIG. 10). Namely, when the reference coordinate system is revised during machining or when a machining mode achieveable by a single tool (referred to as "single tool mode", hereinunder) is inputted, the searching area is divided by the unit No. UNO of such program. Namely, the tool lineup control unit 23 does not search across such a unit No. UNO. As shown in the step (23), the tools registered in the third region 45 are lined up in the downward order of finishing face mill, finishing end mill, reamer, tap and boring in the memory 25 as viewed in FIG. 12, for each of a series of programs which are delimited by the coordinate setting bearing unit No. UNO 1, machining end instruction (END) bearing unit No. UNO 9 and the single tool mode.

Figure 13:
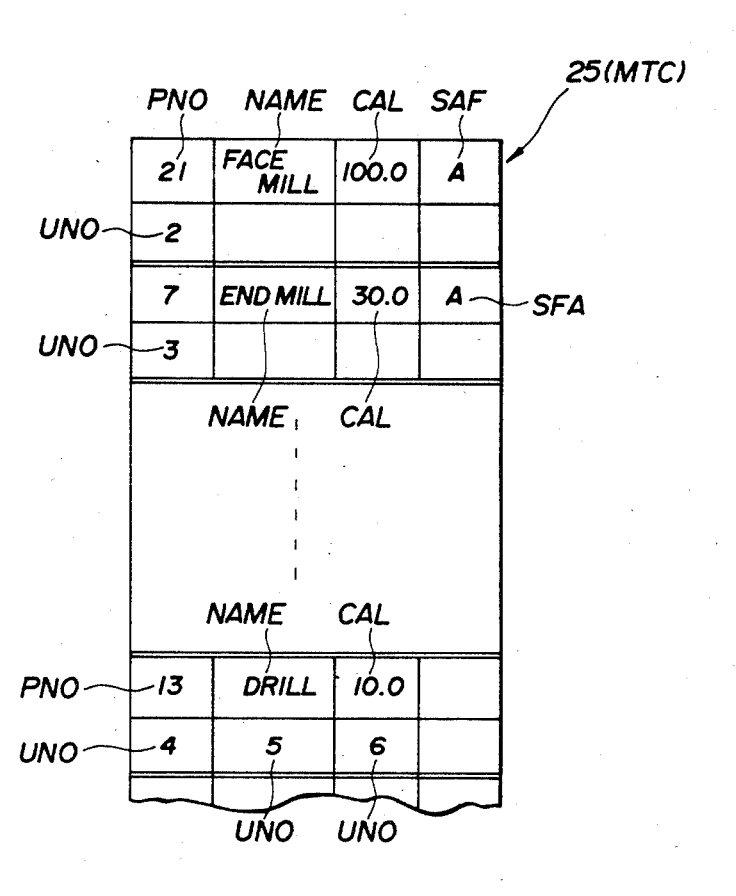

When the storage or registration is completed for the tool names NAME of tools pertaining to all machining units of the machining program PR01, the machining tool combination MTC has been formed in the memory 25 in which, as shown in the step (26) in FIG. 12, the names NAME of the tools to be employed for the aimed machining of the work are correctly lined up in the sequence of use from the upper side to the lower side as viewed in the Figure. To explain in more detail the content of the memory 25, as shown in FIG. 13, the memory 25 stores, besides the tool names NAME, nominal sizes CAL and section suffix SAF of the tools registered in the memory 25, the pocket Nos. of the pockets to which these tools are alloted and the program unit Nos. UNO of the program units which make use of these tools. The tool lineup control unit 23 operates to record in the memory 25 the program unit Nos. UNO even for the machining units have the tools the registration of which have been refused because of presence of anteceding registration found out in the search over the region 43. Therefore, by reading out the program unit No. UNO from the memory 25, it is possible to know all of the kinds of machining to be performed by such tool.

When the lineup of machining tools, i.e. the machining tool combination MTC, is completed in the memory 25, the main control unit 13 drives the tool lineup control unit 23 to read out the names NAME of the tools lined up in the memory 25 in sequence from the upper side to the lower side of the machining tool combination MTC as viewed in FIG. 13, and delivers these data together with the machining position informations for respective machining units in the machining program PR01 to the program conversion unit 21 which in turn converts these data into an execution program PR02 in terms of machine code. The execution program PR02 is then stored in the execution program buffer memory 35.

Thereafter, the operator puts the workpiece W on the X-Y table 3 and instructs the main control unit 13 through the control panel 19 to start the machining. In response to this instruction, the main control unit 13 drives the auxiliary control unit 36, spindle control unit 37 and the shaft control unit 39 so that the required machining is executed in accordance with the execution program PR02. Accordingly, the machining is conducted by the tool sequence lined up in the machining tool combination MTC stored in the tool set memory 25. When a tool 6 is mounted on the spindle 7 for a machining of the point machining mode, the machining is made in accordance with the program unit Nos. UNO recorded in the memory 25, for all machining units simultaneously without tool exchange by the tool exchanger 9. Namely, in the case of drilling by the drill 10.0, the drilling is made for the machining units of the unit Nos. UNO corresponding to 4, 5 and 6 from the left side as viewed in FIG. 13, without making exchange of tool, i.e. by the same drill 10.0. As stated before, the tools for rough machining in the surface and line machining modes are registered in the first region 42 shown at the upper part of FIG. 11, while the finishing tools are registered in the third region 45. Therefore, the workpiece W is at first roughly machined and then machinings of point machining mode are effected without any disorder or disturbance of tool sequence presented by the tool combination line TCL in each machining unit. Then, the finish machining is conducted to complete the machining. The common service for a plurality of machining units offered by the tool 6 in the second region 43 is made with minimum machining error, because the search over the content of the tool set memory 25 performed by the tool lineup control unit 23 is made only in the same coordinate system. In addition, since the above-mentioned search is not made across a single tool mode machining, various problems are avoided such as interference between the tool 6 and the workpiece W, which may for otherwise be caused when, for example, a machining of a point machining mode which is to be conducted after the single tool machining mode is erroneously made before the latter.

Although a preferred embodiment has been described with specific reference to a machining center, needless to say, it will be clear to those skilled in the art that the invention is equally applicable to any kind of numerical control machine tools of the type in which the operator gives instruction to the machine in terms of the machining units.

As has been described, according to the invention, tool combination lines TCL corresponding to machining units selected in accordance with the desired machining shape are stored in a machining program memory 20, and the tools presented by the tool combination lines TCL stored in the memory 20 are rearranged and lined up on the basis of the tools to form a machining tool combination MTC in a tool set memory 25. The machining is conducted in accordance with this machining tool combination MTC in such a manner that the machinings in different machining units, achieveable by a tool common to these machining units, are conducted by such tool simultaneously without exchange of the tool. In the method mentioned before in which the machining units are directly executed in sequence, the frequency of tool exchange is impractically high because, even if there is any tool usable for different machining units, such tool has to be mounted and demounted at each time of start and finish of machining to be made by such tool in each independent machining unit. It is remarkable that the present invention eliminates the increase of the frequency of tool exchange due to the repeated mounting and demounting of such tool. In addition, the invention eliminates the necessity for troublesome programming work and, hence, can shorten the whole machining time considerably.

Although the invention has been described through specific terms, it is to be noted here that the described embodiment is only illustrative and not exclusive, and the invention covers all possible changes and modifications imparted to the described embodiment within the scope or spirit of the invention which is limited solely by the appended claims.

What is claimed is:

1. A method of controlling a lineup of tools in a numerical control machine tool comprising the steps of:
   classifying a machining operation into a plurality of machining units each machining unit corresponding to a portion of the machine operation to be carried out, in accordance with a desired workpiece shape;
   storing, in a tool combination memory, tool combination line data containing the names of tools in the sequences for use for respective machining units;
   selecting the machining units to be used to machine a particular workpiece so that corresponding tool combination line data corresponding thereto are read out as units from said tool combination memory;
   storing, in a machining program memory, tool combination line data read out from said tool combination memory corresponding to the selected machining units for respective machining units;
   forming machining tool combination data in a tool set memory by rearranging, on the basis of the tools, said tool combination line data so that machining units calling for use of the same tool are carried out in succession; and
   machining in accordance with said machining tool combination data, whereby the machinings to be made in at least certain classified machining units by the same tool are made in immediate succession to one another to obviate the need for tool changing.

2. A method according to claim 1 wherein said step of machining comprises the step of machining with a common tool sequentially without using another tool inbetween.

3. A method according to claim 1 wherein said step of machining comprises the step of machining with a common tool consecutively.

4. A method according to claim 1, wherein said step of classifying comprises the step of classifying a machining operation into point, line and surface machining modes, each machining mode corresponding to a portion of the machining operation and including one or more machining units.

5. A method according to claim 4, further comprising the steps of:
   dividing said tool set memory into a first region, a second region and a third region;
   storing in said first region the names of rough machining tools of machining units belonging to said line machining mode or surface machining mode;
   storing in said third region the names of finish machining tools of machining units belonging to said line machining mode or said surface machining mode; and
   storing in said second region the names of tools in accordance with the sequence of use presented by the tool combination line of the machining unit when said machining unit belongs to said point machining mode.

6. A method of controlling lineup of tools in numerical control machine tool according to claim 5, wherein said step of storing in said second region comprises the step of searching for the name of an identical tool in said second region, and then storing said tool name only when the identical tool has not been previously stored in said second region.

7. A method of controlling a lineup of tools in a numerical control machine tool according to claim 6, wherein said search over said second region is made only for successively inputted machining units belonging to said point machining mode.

8. A method of controlling a lineup of tools in a numerical control machine tool according to claim 6, wherein said tool combination line data corresponding to machining units are provided with their own unit numbers, and program unit numbers corresponding to said machining units to be performed simultaneously by each tool stored in said tool set memory.

9. A method of controlling lineup of tools in numerical control machine tool according to claim 8, wherein said search over said second region is made only for successively inputted machining units belonging to said point machining mode.

* * * * *